United States Patent [19]

Pfennings et al.

[11] Patent Number: 4,817,090
[45] Date of Patent: Mar. 28, 1989

[54] INTEGRATED ELECTRONIC MULTIPLEX CIRCUIT

[75] Inventors: Leonardus C. Pfennings; Hendrikus J. Veendrick; Adrianus T. Van Zanten, all of Eindhoven, Netherlands

[73] Assignee: U. S. Philips Corporation, New York, N.Y.

[21] Appl. No.: 855,577

[22] Filed: Apr. 25, 1986

[30] Foreign Application Priority Data

May 3, 1985 [NL] Netherlands ............... 8501256

[51] Int. Cl.$^4$ ............................................. H04J 3/04
[52] U.S. Cl. ................................... 370/112; 328/104; 307/243
[58] Field of Search ................. 370/112; 307/243; 328/104

[56] References Cited

U.S. PATENT DOCUMENTS

| | | | |
|---|---|---|---|
| 3,751,679 | 8/1973 | Rotier | 307/243 |
| 3,917,961 | 11/1975 | Reed | 307/243 |
| 4,390,987 | 6/1983 | Best | 370/112 |
| 4,593,390 | 6/1986 | Hildebrand et al. | 370/112 |
| 4,648,105 | 3/1987 | Priebe et al. | 328/104 |

OTHER PUBLICATIONS

Veendrick et al., "A 40 MHz 308 Kb CCD Video Memory", IEEE Internat'l Solid-State Circuits Conference, 1984, pp. 206-207.

Primary Examiner—Douglas W. Olms
Assistant Examiner—Wellington Chin
Attorney, Agent, or Firm—Michael E. Marion

[57] ABSTRACT

A multiplex circuit includes a cascade connection of flip-flop elements for producing a high data-rate multiplex signal. In order to avoid disturbances caused by parallel loading of the flip-flop circuits, the slave-section of the flip-flop generating the multiplex signal is not parallel loaded, which results in a continuous output signal.

8 Claims, 2 Drawing Sheets

INTEGRATED ELECTRONIC MULTIPLEX CIRCUIT

BACKGROUND OF THE INVENTION

The invention relates to an integrated electronic multiplex circuit which includes N (N>1) data inputs, a data output for a multiplexed signal, a clock input for receiving a clock signal, and a start input for receiving a start signal. Data on the N data inputs appears sequentially on the data output, after the occurence of a first state of the binary start signal, under the control of the clock signal.

The invention also relates to an integrated electronic circuit which includes a multiplex circuit.

A circuit of this kind is disclosed in Digest of Technical Papers of the IEEE International Solid State Circuits Conference, pages 206–207 which shows a block diagram of a video memory which includes a multiplex circuit. However, it is not shown how this circuit can be realized. The conversion of a constant stream of parallel data into an uninterrupted multiplexed signal at a very high clock frequency (for example, some tens of MHz) imposes special requirements on the multiplex circuit. Moreover, the multiplex circuit must be suitable for integration on the same semiconductor substrate as the memory field.

The multiplex circuit in said video memory could be constructed by using a switching network with transfer gates (as in the known Philips IC HEF 4512B) and a binary counter. The start signal sets a given count in the binary counter, which count is incremented by each clock signal pulse. The counter indicates the data input which is connected by the switching network to the data output for generating the multiplexed signal thereon. However this solution is too slow for use with such high clock frequencies; moreover it occupies a large amount of surface area when it is integrated. The switching network includes a number of parallel conductors which apply the control signals from the counter to the transfer gates. Particularly at such high clock frequencies the invariably occurring phase differences between the signals on these parallel conductors cause disturbances in the multiplexed signal, which are more pronounced as the clock frequency increases and which ultimately inhibit the supply of relevant data by the multiplex circuit.

SUMMARY OF THE INVENTION

It is an object of the invention to provide a multiplex circuit which is capable of generating a continuous data stream with a high switching speed and which is suitable for integration on a semiconductor substrate.

To achieve this, a multiplex circuit in accordance with the invention includes a shift register which, in turn, includes a cascade connection of N flip-flop circuits each having a master section and a slave section, the master section of the $n^{th}(1<n<N)$ flip-flop circuit assuming a binary state corresponding to the data on the $n^{th}$ data input upon reception of the first state of the start signal and a first state of the clock signal, while the slave section of the $n^{th}$ flip-flop circuit simultaneously assumes a binary state corresponding to the data on the $n+1^{th}$ data input, with the exception of the slave section of the $N^{th}$ flip-flop circuit the state of which remains the same and an output of which is connected to the data output.

The shift register is smaller than the switching network with the binary counter. When the first state of the start signal and the clock signal is received, the slave section of a flip-flop circuit and the master section of the subsequent flip-flop circuit are simultaneously loaded with the data on the associated data input. The loading of flip-flop circuits requires a given amount of time. Resulting disturbances of the multiplexed signal can be prevented by loading the shift register in the described manner.

A first preferred embodiment of the invention is characterized in that the master section of the first flip-flop circuit assumes a first binary state upon reception of a second state of the start signal and the first state of the clock signal, the start signal being switched to the second state after all flip-flop circuits have assumed a state corresponding to the data on the associated data inputs, the start signal being maintained in the second state during $N-1$ subsequent first states of the clock signal.

When the sections of the flip-flop circuits to be loaded have a given binary state prior to loading, the means for loading these sections can be simplified. These loading means must merely be capable of switching, if necessary, the master section or slave section from the first to the second binary state. Consequently, the loading means are simplified and the multiplex circuit becomes smaller and faster.

When the master and slave sections receive the same clock signal, at high clock frequencies, the occurrence of a disturbing phase shift between the clock signals received by the various master and slave sections is prevented.

DESCRIPTION OF THE DRAWINGS

An embodiment of the invention will be described in detail hereinafter with reference to the drawings; wherein.

DESCRIPTION OF THE PREFERRED EMBODIMENT

Figure 1:
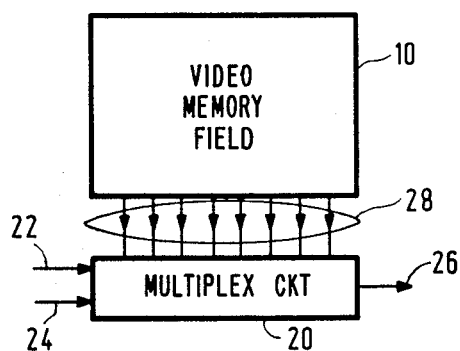
FIG. 1 shows an example of an integrated electronic circuit which includes a multiplex circuit.

FIG. 1 shows an example of an integrated electronic circuit which includes a multiplex circuit. This example is derived from the previously cited reference.

A video memory field (10) applies parallel data to the data inputs (28) of the multiplex circuit (20). After reception of a start signal (22), these data appear serially, under the control of a clock signal (24), on the data output (26), thus forming the multiplexed signal. After the various data have appeared on the data output, a new cycle, which is initiated by the next start signal, commences.

A multiplex circuit in accordance with the invention is particularly suitable for use in an integrated circuit having a high processing speed, for example, in said video memory. However, the applications of the invention are by no means restricted thereto; the invention can be used in practically any field of electronics, for example, for microprocessors, telecommunication and electronic signal and data processing.

Figure 2:
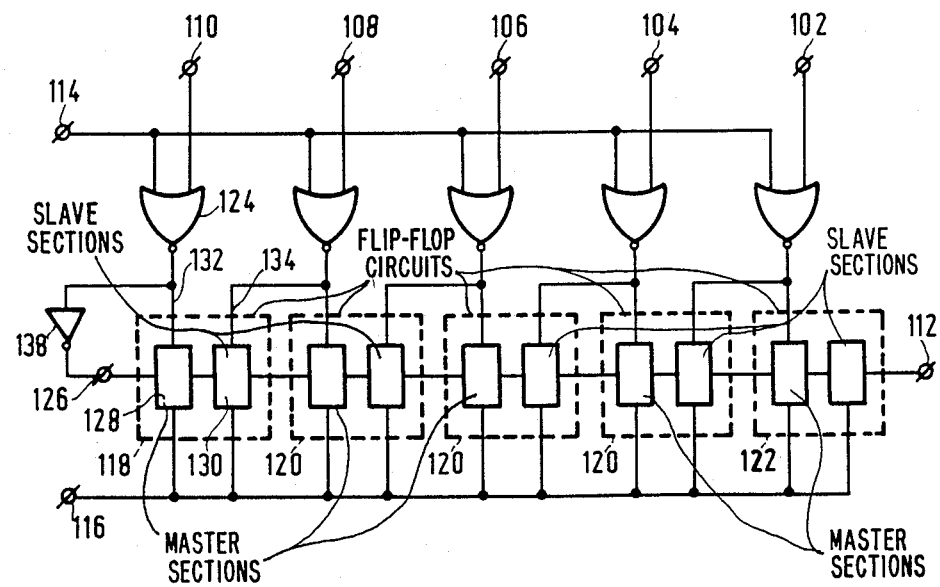
FIG. 2 shows a multiplex circuit in accordance with the invention.

FIG. 2 shows a multiplex circuit in accordance with the invention. For the sake of simplicity and clarity, only five data inputs are shown; in practice this circuit may include an arbitrary number of data inputs. The multiplex circuit includes a cascade connection of flip-flop circuits (118, 120, 122) each having a master section (128) and a slave section (130). The output of the slave section of the last flip-flop circuit (122) is connected to the data output (112) and generates the multiplexed signal. Each master and slave section is connected to the clock input (116). The data inputs (102, 104, 106, 108, 110) are connected to NOR-gates (124) which are also connected to the start input (114) in order to receive the start signal. The outputs of the NOR-gates are connected irespectively to the load inputs (132) of the master sections (128). The load inputs (134) of the slave section (130) are each connected to the load inputs (132) of the master section (128) of the next flip-flop circuit with the exception that the slave section (130) at the last flip-flop circuit (122) does not include a load input. An input (126) of the first flip-flop circuit (118) is connected, via an inverting circuit (138), to the load input (132) of its master (128). The sections which can be loaded are constructed so that they are simultaneously loaded with a "0" when the clock signal and the signal on the relevant load input are both "1". Loading with a "1" is not possible and it will be demonstrated that such loading is superfluous.

Figure 3:
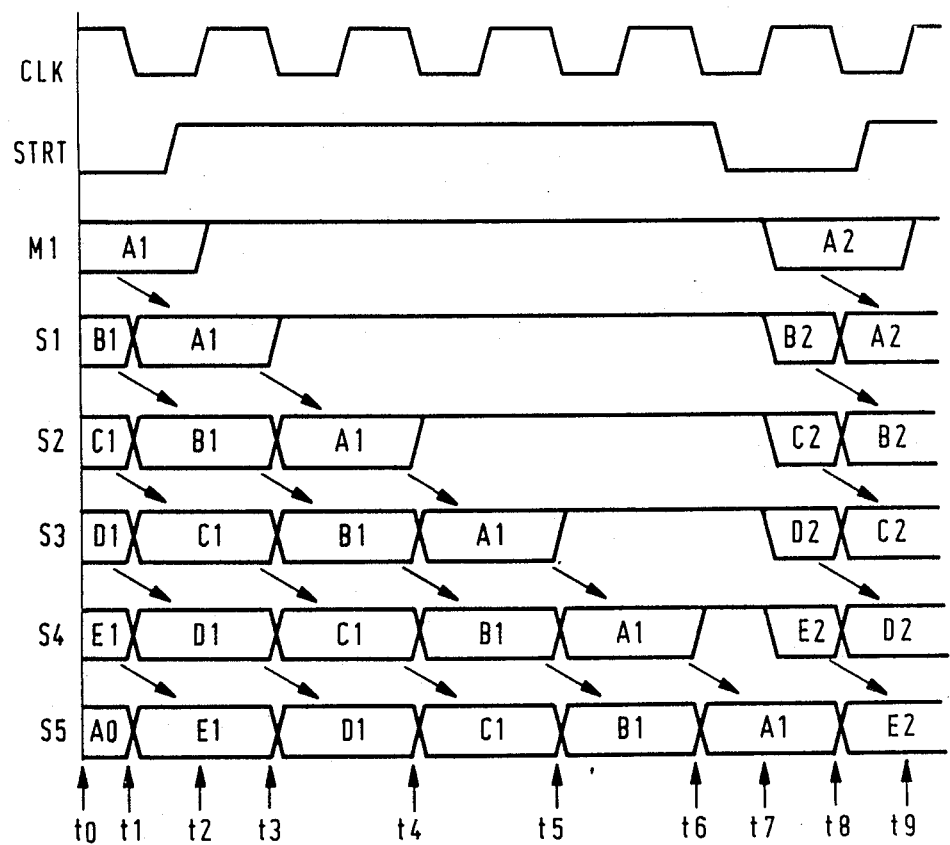
FIG. 3 shows a signal chart.

The operation of the multiplex circuit will be described with reference to FIG. 3. At the instant t0, the start signal (STRT) is low or "0" and the clock signal (CLK) is high or "1". The master section (128) of the first flip-flop circuit (118) is loaded with A1. The slave sections (130) of the first to the fourth flip-flop circuits (S1, S2, S3, S4) are loaded with B1, C1, D1 and E1, respectively; the contents of the slave section of the last flip-flop circuit (S5) remain the same (A0). S5 supplies the output signal of the multiplex circuit. At t1, CLK changes from high to low, which means that the master sections transfer their data to the slave section of the same flip-flop circuit. Between the instants t1 and t2 STRT must be switched from low to high in order to prevent renewed loading at t2, At t2 the master sections take over the data of the slave sections of the preceding flip-flop circuit. The master section of the first flip-fop circuit (118) takes over a "1" from the input 126. At t3 to t6, the data is shifted through to shift register in the same way. Between t6 and t7, STRT changes from high to low in order to load new data at t7. All sections of the flip-flop circuits loaded are now "1". This means that the loading means must merely be capable of loading a "0", so that the flip-flop circuit can be simplified. Loading takes place again at the instant t7; S5, however, remains the same so that the loading operation does not disturb the multiplex signal. Subsequently, the whole cycle is started again; t8 then corresponds to t1. This multiplexer circuit offers major advantages over a conventional type. First of all, the data on the data inputs need be present only during a small part of the cycle (from t7 till t8), so that the memory field has a substantial amount of time available for fetching the data for the next cycle. This property is important notably in the case of a high clock frequency. Moreover, this multiplex circuit is highly insusceptible to phase differences between the signals STRT and CLK. The only requirement to be imposed on these signals is that the signal STRT must become low after t6 and high again before t9; it must also be low for a sufficient period of time between t7 and t8 to enable the relevant flip-flop circuits to be loaded. In many cases, phase shifts between STRT and CLK will not influence the behaviour of the multiplex circuit. This is one of the reasons why the speed of this multiplex circuit depends hardly at all on the number of data inputs.

Figure 4:
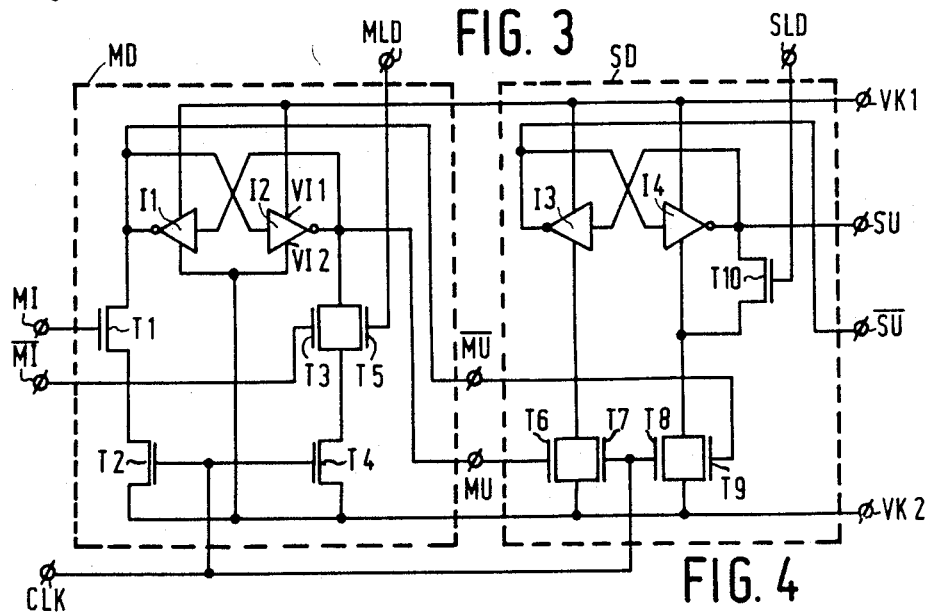
FIG. 4 shows a flip-flop circuit for use in an embodiment of the invention.

FIG. 4 shows an example of a flip-flop circuit for use in a multiplex circuit in accordance with the invention. The flip-flop circuit comprises a master section (MD) and a slave section (SD). The master section MD includes two inputs (MI and $\overline{MI}$), a load input (MLD), and two outputs (MU and $\overline{MU}$). The slave section SD includes two inputs, a load input (SLD) and two outputs (SU and $\overline{SU}$). Both sections are connected to a first (VK1) and a second (VK2) supply terminal and the clock input (CLK). The master section MD includes a first (I1) and a second (I2) inverting circuit which includes an input, an output, and a first (VI1) and a second (VI2) supply input. The first and second supply inputs of both inverting circuits I1 and I2 are connected to VK1 and VK2, respectively. The outputs of I1 and I2 are connected to outputs $\overline{MU}$ and MU, respectively; the input of I1 is connected to the output of I2, and Vice versa.

In a first set circuit, the channels of a first (T1) and a second (T2) insulated gate field-effect transistor (IGFET) are connected in series between $\overline{MU}$ and VK2. The gate of the IGFET T2 is connected to CLK. In a second set circuit, the channels of a third (T3) and a fourth (T4) IGFET are connected in series between MU and VK2. The channel of a fifth IGFET (T5) is connected in parallel with the channel of the IGFET T3. The gate of the IGFET T3 is connected to $\overline{MI}$ that of the IGFET T4 to CLCK and that of the IGFET T5 to MLD. The slave section (SD) includes a third and a fourth inverting circuit (I3 and I4), each of which is connected to VK1 by way of its first supply input. The output of I3 is connected to the input of I4, and vice versa. The section SD also includes a third set circuit in which the parallel connected channels of a sixth (T6) and a seventh (T7) IGFET are connected between the second supply input of I3 and VK2. The parallel connected channels of an eigth (T8) and ninth (T9) IGFET of a fourth set circuit are connected between the second supply input of I4 and VK2. The fourth set circuit also includes a tenth IGFET (T10) whose channel is connected between the output SU and the second supply input of I4. The gates of the IGFETs T7 and LT8 are connected to CLK, that of IGFET T6 to MU and that of IGFET T9 to $\overline{MU}$; the gate of IGFET T10 is connected to SLD. The output of I4 is connected to $\overline{SU}$, and that of I3 to SU. MI and $\overline{MI}$ form the inputs of the flip-flop circuit, and SU and $\overline{SU}$ form its outputs. IGFET T3 in the first flip-flop circuit (118, FIG. 2) and IGFET T10 in the last flip-flop circuit (122, FIG. 2) can be dispensed with.

The operation of the flip-flop circuit of FIG. 4 is as follows: when the clock signal is low, the IGFETs T2, T4, T7 and T8 are turned off. In that state the inputs MI, $\overline{MI}$ and MLD do not influence the state of the master section SD. The master section SD controls the inputs of the slave section SD so that the IGFET T6 or the IGFET T9 is turned on and the ouput of the associated inverting circuit (I3 or I4) becomes low. The output of the other inverting circuit (I4 or I3) is high. The input SLD again does not influence the state of the slave section SD. Summarizing, it can be said that the slave sections SD take over the state of the master sections SD when the clock signal is low.

When the clock signal is high, the IGFETs T2, T4, T7 and T8 are turned on. In that case, the master section MD does not influence the state of the slave section SD. A high signal on SLD forces the slave section SD to assume the "0" state, which means that SU is low and SD is high. The inputs MI, $\overline{MI}$ and MLD determine the state of the master section MD. When MI is low and $\overline{MI}$ is high, the master section MD assumes the state "0" (MU low, $\overline{MU}$ high). When MI is high and $\overline{MI}$ is low, the master section MD will assume the state "1" when MLD is low. However, when MLD is high in those circumstances, the state will be arbitrary for a brief period of time because MU is low (via the first and the second IGFET) as well as $\overline{MU}$ (via the fifth and the fourth IGFET). This situation is resolved in the cascade circuit shown in FIG. 2.

The inverting circuit (138) in the first flip-flop circuit (118) ensures that MLD and MI cannot be simultaneously high or low. When MLD is high, the master section MD assumes the state "0"; when MLD is low, the master section MD assumes the state "1".

In the other flip-flop circuits (120, 122), MLD is connected to SLD of the preceding flip-flop circuit. When MLD is high, MI will become low after a brief period of time because the preceding slave section becomes "0", so that the master section can also become "0". Summarizing, it can be said that when the clock signal is high and MLD is low, the master section will take over the state of the preceding slave section, the master section of the first flip-flop circuit then assuming the state "1".

When the clock signal and MLD are high, the master section and (if applicable) the preceding slave section assume the state "0".

These switching functions render the flip-flop circuit suitable for use in a multiplex circuit in accordance with the invention.

What is claimed is:

1. An integrated electronic multiplex circuit comprising:
   a plurality of logic gates connected to receive N individual data signals, said gates connected to be enabled by a start signal having first and second states;
   a plurality of N flip-flop circuits serially connected to form a shift register wherein a first flip-flop circuit represents the lowest order section of said shift register and each of flip-flop circuits 2 through N represents increasingly higher order sections, each flip-flop circuit including a master and slave sections, each of said master sections having an input for receiving one of said data signals from said logic gates, each of said slave sections having an input connected to an input of the master section of its adjacent higher order flip-flop circuit, each of said master and slave sections having a clock input for receiving a clocking signal having first and second states, each of said master sections of each flip-flop circuit assuming a data state of its respective input in response to said start signal, and all but the slave section of the Nth flip-flop circuit assuming a state of a data signal present at the input of the master section of its adjacent higher order flip-flop circuit; and
   a data output terminal connected to the slave section of said Nth flip-flop circuit for providing an output serial data signal.

2. An integrated electronic multiplex circuit as claimed in claim 1, wherein the master section of said first flip-flop circuit assumes a first binary state upon reception of a second state of the start signal and the first state of said clocking signal.

3. An integrated electronic multiplex circuit as claimed in claim 2 or 1 the master sections as well as the slave sections of the N flip-flop circuits receiving said clocking signal.

4. An integrated electronic multiplex circuit as claimed in claim 1, wherein the start signal assumes the second state after each of said master sections of said N flip-flop circuits has assumed a state corresponding to the data on its input, the start signal being maintained in the second state during a number of subsequent first states of said clocking signal corresponding to an amount 1 less than the total number, N, of flip-flop circuits.

5. An integrated electronic multiplex circuit as claimed in claim 4, wherein the master sections and the slave sections, with the exception of the slave section of the highest order flip-flop circuit, include a load input for receiving a load signal, the load inputs of the slave section of the $m^{th}$ flip-flop circuit receiving an identical load signal, where m is greater than or equal to 1 but less than N, a first state of the $n^{th}$ load signal, where n is greater than or equal to 1 but less than N, indicating that the start signal is in the first state and that the master section of the $n^{th}$ flip-flop circuit responding to the data on the $n^{th}$ data input, must be switched from the first to the second binary state.

6. An integrated electronic multiplex circuit as claimed in claim 5, wherein the $n^{th}$ load signal is generated by an $n^{th}$ NOR-gate having a first input which receives the start signal and a second input which receives the data on the $n^{th}$ data input.

7. An integrated electronic multiplex circuit as claimed in claim 6, wherein at least one flip-flop circuit includes a first, a second, a third and a fourth inverting circuit, each of which includes a first and a second supply input, an input and an output, the first supply inputs of each flip-flop circuit being connected to a first supply terminal, the input of the first inverting circuit being connected to the output of the second inverting circuit and vice versa, the second supply inputs being connected to a second supply terminal, a first and a second series connection of channels of a first and second and a third and fourth insulated gate field-effect transistor (IGFET), respectively, connecting the output of the first and the second inverting circuit, respectively, to the second supply terminals, the gates of the second and the fourth IGFET receiving the clocking signal while the gates of the first and the third IGFET serve as inputs for the flip-flop circuit, the channel of a fifth IGFET being connected in parallel with the channel of the third IGFET, the gate of the fifth IGFET constituting the load input of the master section of said flip-flop circuit, the output of the third inverting circuit being connected to the input of the fourth inverting circuit and, vice versa a first and a second parallel connection of the channels of a sixth and seventh and an eigth and ninth IGFET, respectively, connecting the second supply input of the third and the fourth inverting circuit, respectively, to the second suppy terminal, the gates of the seventh and eighth IGFET receiving the clock signal, the gate of the sixth and the ninth IGFET being connected to the output of the second and the first inverting circuit, respectively, the channel of a tenth IGFET being connected between the output and the second supply input of the fourth inverting circuit, its gate constituting the output of the flip-flop circuit.

8. An integrated electronic circuit which includes a multiplex circuit as claimed in claim 7, wherein the inputs of said master sections of said flip-flop circuits are connected to data outputs of a memory field of a memory integrated on the same substrate.

* * * * *